United States Patent
Shinchi et al.

(10) Patent No.: US 8,545,292 B2
(45) Date of Patent: Oct. 1, 2013

(54) TWO-COMPONENT URETHANE RESIN COMPOSITION FOR POLISHING PAD, POLYURETHANE POLISHING PAD, AND METHOD FOR PRODUCING POLYURETHANE POLISHING PAD

(75) Inventors: Tomoaki Shinchi, Osaka (JP); Hiroshi Suzaki, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/379,799

(22) PCT Filed: May 19, 2010

(86) PCT No.: PCT/JP2010/058410
§ 371 (c)(1),
(2), (4) Date: Mar. 6, 2012

(87) PCT Pub. No.: WO2011/001755
PCT Pub. Date: Jan. 6, 2011

(65) Prior Publication Data
US 2012/0202409 A1 Aug. 9, 2012

(30) Foreign Application Priority Data

Jun. 29, 2009 (JP) ................................. 2009-153603

(51) Int. Cl.
*B24D 3/20* (2006.01)
(52) U.S. Cl.
USPC ............................................ 451/526; 51/297
(58) Field of Classification Search
USPC .................. 451/526, 527, 533, 534; 51/293, 51/297, 298
See application file for complete search history.

(56) References Cited

U.S. PATENT DOCUMENTS

| 6,986,705 | B2 * | 1/2006 | Preston et al. ................ 451/526 |
| 2004/0224622 | A1 | 11/2004 | Sakurai et al. |
| 2005/0064709 | A1 | 3/2005 | Shimomura et al. |
| 2006/0280929 | A1 | 12/2006 | Shimomura et al. |
| 2006/0280930 | A1 | 12/2006 | Shimomura et al. |
| 2008/0313967 | A1 | 12/2008 | Sakurai et al. |
| 2010/0048102 | A1 | 2/2010 | Nakai et al. |
| 2012/0100783 | A1 * | 4/2012 | Itoyama et al. ................ 451/36 |

FOREIGN PATENT DOCUMENTS

| JP | 2004-43768 | A | 2/2004 |
| JP | 2004-167680 | A | 6/2004 |
| JP | 2004-211076 | A | 7/2004 |
| JP | 2004-330411 | A | 11/2004 |
| JP | 2005-68168 | A | 3/2005 |
| JP | 2005-68175 | A | 3/2005 |
| JP | 2006-111700 | A | 4/2006 |
| JP | 2006-320982 | A | 11/2006 |
| JP | 2007-42923 | A | 2/2007 |
| JP | 2008-238361 | A | 10/2008 |
| JP | 2008-252017 | A | 10/2008 |
| JP | 2010-5746 | A | 1/2010 |

* cited by examiner

*Primary Examiner* — Robert Rose
(74) *Attorney, Agent, or Firm* — McDermott Will & Emery LLP

(57) ABSTRACT

The present invention relates to a two-component urethane resin composition for a polishing pad including a base resin containing an isocyanate group-terminated urethane prepolymer (A) and a curing agent containing an isocyanate group reactive compound (B), and characterized in that the prepolymer (A) is a prepolymer having an isocyanate group equivalent of 250 to 700 and being produced by reacting a polyisocyanate (a1) with an aromatic polyester polyol (a2) and a polyether polyol (a3) which are used as polyol components in combination at a mass ratio of (a2)/(a3)=5/95 to 70/30, and the aromatic polyester polyol (a2) has 2 to 11 aromatic rings in its molecular chain, and also relates to a polyurethane polishing pad using the resin composition and a method for producing a polyurethane polishing pad.

9 Claims, No Drawings

TWO-COMPONENT URETHANE RESIN COMPOSITION FOR POLISHING PAD, POLYURETHANE POLISHING PAD, AND METHOD FOR PRODUCING POLYURETHANE POLISHING PAD

CROSS REFERENCE TO PRIOR APPLICATIONS

This application is a U.S. National Phase application under 35 U.S.C. §371 of International Application No. PCT/JP2010/058410, filed on May 19, 2010 and claims benefit of priority to Japanese Patent Application No. 2009-153603, filed on Jun. 29, 2009. The International Application was published in Japanese on Jan. 6, 2011 as WO 2011/001755 A1 under PCT Article 21(2). The contents of the applications are hereby incorporated by reference.

TECHNICAL FIELD

The present invention relates to a two-component urethane resin composition for a thermosetting urethane (TSU)-type polishing pad used in the field of glass polishing of glass substrates, silicon wafers, semiconductor devices, and the like, a polyurethane polishing pad using the resin composition, and a method for producing a polyurethane polishing pad.

BACKGROUND ART

In generally producing polished glass products which are required to have a high degree of surface flatness and in-plane uniformity, such as a liquid crystal display (LCD) glass substrate, a hard, disk (HDD) glass substrate, a recording device glass disk, an optical lens, a silicon wafer, a semiconductor device, and the like, first a "rough cutting step" using a polishing pad made of an urethane resin is performed as a first step, and then a "finishing step" using an abrasive cloth for fine polishing is performed as a second step.

As a general method for producing the polishing pad made of a urethane resin, so far, there have been proposed various methods, for example, using a so-called two-component urethane resin composition including a combination of a curing agent and a base resin which contains an isocyanate group-terminated urethane prepolymer.

As a polishing pad using such a two-component polyurethane resin composition, for example, a polishing pad having a polishing layer composed of a polyurethane resin foam having fine foam cells is known, in which the average cell diameter of the fine foam cells is 20 to 70 µm, a rate of thermal dimensional change of the polishing layer is 3% or less, the polyurethane resin foam contains an isocyanate component and a polyol component as raw material components, the isocyanate component contains an aromatic diisocyanate and an alicyclic diisocyanate, the content of the polyol component in the polyurethane resin foam is 15 to 55% by weight, the aromatic diisocyanate is toluene diisocyanate, the alicyclic diisocyanate is dicyclohexylmethane diisocyanate, the polyol component is a polyether polyol having a number-average molecular weight of 500 to 5000, the polyurethane resin foam contains an isocyanate-terminated prepolymer containing an isocyanate component, a polyol component, and a low-molecular-weight polyhydric alcohol, and a chain extender, and the average number of functional groups of the polyol component and the low-molecular-weight polyhydric alcohol is 2.0 to 2.8. In this polishing pad, the rate of thermal dimensional change of the polishing layer during use can be relatively easily controlled to 3% or less by using the foam, and even when a temperature rise occurs due to frictional heat generated in a polishing process, deterioration in flattening characteristics can be decreased as compared with conventional polishing pads (refer to, for example, Patent Literature 1).

However, when a work piece is polished using the polishing paid composed of the two-component polyurethane composition described in Patent Literature 1, the polishing pad having low hardness has low elasticity, and thus the polishing pad composed of the two-component polyurethane resin composition has the problem that settling occurs due to the pressure generated between the polishing pad and the work piece, and a change in hardness (elastic modulus) occurs during a polishing work, thereby causing difficulty in use for uniform polishing of glass products required to have a high degree of surface flatness and in-plane uniformity.

In addition, a polyol composition for a two-component curable foam grindstone is known, in which (A) a polyaminochlorophenylmethane mixture containing 50 to 70% by weight of a binuclear polyaminochlorophenylmethane compound, 20 to 40% by weight of a trinuclear polyaminochlorophenylmethane compound, and 5 to 10% by weight of a tetranuclear or higher-nuclear polyaminochlorophenylmethane compound is uniformly dissolved in (B) a polyol so that an (A)/(B) ratio by weight is 30/70 to 60/40, the polyol (B) being a polyol having a molecular weight of 100 to 1500 and an ether bond in a main chain and/or a polyol having a molecular weight of 50 to 500 and a methyl group in a side chain. Such a polyol composition for a two-component curable foam grindstone includes specified amounts of the polyaminochlorophenylmethane compound (A) and the polyol (B) and thus shows good compatibility, good dissolution stability, and liquid properties, whereby a foam for a grindstone can be molded with a simple two-component mixing-casting machine, water as a foaming agent can be added to a polyol composition containing 3,3'-dichloro-4,4'-diaminodiphenylmethane (MBOCA) as an amine curing agent, and the temperature of the composition for a two-component curable foam grindstone can be controlled to the boiling point of water or less, thereby producing a foam grindstone having a uniform density distribution and good mechanical physical properties because water is not scattered during molding and causing usefulness for polishing fine glass products of glass, semiconductor silicon, and the like (refer to, for example, Patent Literature 2).

However, the polyol composition for a two-component curable foam grindstone described in Patent Literature 2 has the problem that it is embrittled and made easy to wear by increasing the MBOCA amount in the curing agent, leading to a decrease in life of a polishing pad, moldability deteriorates clue to an increase in reactivity, and physical properties such as compression set and the like deteriorate, thereby causing difficulty in use for uniform polishing of glass products and the like which are required to have a high degree of surface flatness and in-plane uniformity.

In addition, a two-component composition for a glass polishing polyurethane pad composed of a base resin (a) containing an isocyanate group-terminated urethane prepolymer (A), and a curing agent (b) containing an isocyanate group reactive compound (B), water (C) as a foaming agent, an inorganic polishing agent (D), and a catalyst (E) is known, in which the isocyanate group-terminated urethane prepolymer (A) is an isocyanate group-terminated urethane prepolymer produced by reacting at least a tolylenediisocyanate (A1), poly(tetramethylene ether) glycol (A2), and polycaprolactonetriol (A3) so that when (A2) and (A3) are mixed, an average number of functional groups falls in a range of 2.1 to 2.7, and the isocyanate group reactive compound (B) is composed of at least 4,4'-diamino-3,3'-dichlorodiphenylmethane (B1) and poly(tetramethylene ether) glycol (A2). In this two-component composition for a glass polishing polyurethane pad, the prepolymer has low viscosity, bubble biting and air voids during mixing and molding can be decreased to form uniform foam cells, and the average number of functional groups of the polyol mixture can be easily optimized to suppress decrease in hardness of the polishing pad due to the heat generated during polishing (refer to, for example, Patent Literature 3).

However, when a work piece is polished using a polishing pad composed of the two-component composition for a glass polishing polyurethane pad described in Patent Literature 3, the polishing pad composed of the two-component composition with low hardness has low elasticity and thus has the problem that settling occurs due to large frictional heat generated between the polishing pad and the work piece and pressure generated between the polishing pad and the work piece, thereby causing a change in hardness (elastic modulus) during a polishing work and causing difficulty in use for uniform polishing of glass products and the like which are required to have a high degree of surface flatness and in-plane uniformity.

Further, a polishing pad for Cu-film polishing which has a polishing layer composed of a polyurethane resin foam is known, in which the polyurethane resin foam is a reaction cured product of an isocyanate-terminated prepolymer containing an isocyanate component and a high-molecular-weight polyol component as raw material components and a chain extender, and the high-molecular-weight polyol component contains 30% by weight or more of polyester polyol. The polishing pad for Cu film polishing uses polyester polyol which is a polymer of an oxyethylene derivative and adipic acid and thus has good balance between higher elasticity and hydrolyzability of the polyurethane resin foam and the excellent effect of preventing thinning, dishing, and scratch (refer to, for example, Patent Literature 4).

However, the polishing paid for Cu film polishing described in Patent Literature 4 has the problem remaining unresolved that settling occurs due to pressure generated between the polishing pad and the work piece, thereby causing difficulty in use for uniform polishing in Cu film polishing which is required to have a high degree of surface flatness and in-plane uniformity.

As described above, for the purpose of improving surface flatness and in-plane uniformity, it has been desired to develop a two-component urethane resin composition for a polishing paid which has particularly high hardness (high elasticity), low permanent set, and excellent control of brittleness, fine cell control, and moldability (yield, molding irregularity), and to develop a polyurethane polishing pad and a method for producing a polyurethane polishing pad.

CITATION LIST

Patent Literature

[PTL 1] Japanese unexamined Patent Application Publication No. 2004-43768
[PTL 2] Japanese Unexamined Patent Application Publication No. 2004-211076
[PTL 3] Japanese Unexamined Patent Application Publication No. 2005-68168
[PTL 4] Japanese Unexamined Patent Application Publication No. 2007-42923

SUMMARY OF INVENTION

Technical Problem

An object of the present invention is to provide a two-component urethane resin composition for a polishing pad which has particularly high hardness (high elasticity), low permanent set, and excellent control of brittleness, fine cell control, and moldability (yield, molding irregularity).

Another object is to provide a polyurethane pad suitable for flattening by uniformly polishing glass products which are used for a semiconductor substrate, an optical substrate, a magnetic substrate, and the like and which are required to have both a high degree of surface flatness and in-plane uniformity, and also provide a method for producing a polyurethane polishing pad.

Solution to Problem

As a result of keen research for solving the above-described problems, the inventors found that in a two-component urethane resin composition for a polishing pad which includes a base resin containing an isocyanate group-terminated urethane prepolymer and a curing agent containing an isocyanate group reactive compound and, if required, water as a foaming agent and a catalyst, when the prepolymer is an isocyanate group-terminated urethane prepolymer produced by reacting polyisocyanate with aromatic polyester polyol and polyether polyol, which are essentially used in combination, it is possible to provide a two-component urethane resin composition for a polishing pad which has excellent control of brittleness, fine cell control, and moldability (yield, molding irregularity), particularly high hardness (high elasticity) and low permanent set, and polishing performance such as significantly improved surface flatness and in-plane uniformity, a polyurethane polishing pad using the resin composition, and a method for producing a polyurethane polishing pad, leading to the achievement of the present invention.

That is, the present invention relates to a two-component urethane resin composition for a polishing pad including a base resin containing an isocyanate group-terminated urethane prepolymer (A) and a curing agent containing an isocyanate group reactive compound (B), and characterized in that the prepolymer (A) is a prepolymer having an isocyanate group equivalent of 250 to 700 and being produced by reacting polyisocyanate (a1) with aromatic polyester polyol (a2) and polyether polyol (a3) which are used as polyol components in combination at a mass ratio of (a2)/(a3)=5/95 to 70/30, and the aromatic polyester polyol (a2) has 2 to 11 aromatic rings in its molecular chain.

Also, the present invention relates to a polyurethane polishing pad characterized, by using the two-component urethane resin composition for a polishing pad.

Further, the present invention relates to a method for producing a polyurethane polishing pad characterized by injecting the two-component urethane resin composition for a polishing pad into a mold, foaming and curing the composition, removing a foamed product from the mold, and slicing the foamed product into a sheet.

Advantageous Effects of Invention

A two-component urethane resin composition for a polishing paid according to the present invention has particularly high hardness (high elasticity), low permanent set, and excellent control of brittleness, fine cell control, and moldability (yield, molding irregularity).

In addition, a polyurethane polishing pad according to the present invention exhibits a small change in hardness (elastic modulus) of the polishing pad due to pressure during polishing, low permanent set (a phenomenon generally referred to as "settling"), and excellent brittleness control, wear resistance, and moldability (yield, molding irregularity), and is useful for uniform high-precision polishing of glass products required to have a high degree of surface flatness and in-plane uniformity, for example, a liquid, crystal display (LCD) glass substrate, a hard disk (HDD) glass substrate, a recording device glass disk, an optical lens, a silicon wafer, a semiconductor substrate of a semiconductor device and the like, an optical substrate, a magnetic substrate, and the like.

DESCRIPTION OF EMBODIMENTS

First, a two-component urethane resin composition for a polishing pad according to the present invention is described.

The two-component urethane resin composition for a polishing pad is produced by mixing a base resin containing an isocyanate group-terminated urethane prepolymer (A) and a curing agent containing an isocyanate group reactive compound (B) as an essential component.

The isocyanate group-terminated urethane prepolymer (A) (abbreviated as the "prepolymer (A)" hereinafter) can be produced by reacting a polyisocyanate (a1) and an aromatic polyester polyol (a2) and a polyether polyol (a3) as polyol components or a polyisocyanate (a1) and an aromatic polyester polyol (a2), a polyether polyol (a3), a low-molecular-weight glycol (a4) as polyol components according to a conventional known method. The reaction method for producing the prepolymer (A) is not particularly limited.

The isocyanate group equivalent (NCO equivalent) of the prepolymer (A) falls in a range of 250 to 700, preferably in a range of 350 to 600. If the NCO equivalent of the prepolymer (A) is in this range, moldability (yield and molding irregularity) is excellent, and reactivity during a work can be easily controlled. When the NCO equivalent of the prepolymer (A) is less than 250, reactivity during a work is increased, and moldability (yield and molding irregularity) deteriorates. In addition, when the NCO equivalent exceeds 700, hardness (elasticity) is insufficient, and polishing properties such, as a high degree of surface flatness, in-plane uniformity, and the like deteriorate.

In the present invention, "g/eq" is used as a unit of "equivalent" but is not described.

Examples of the polyisocyanate (a1) include, but are not particularly limited to, aromatic diisocyanates such as tolylene diisocyanate (TDI-100; 2,4-toluene diisocyanate, TDI-80; a mixture of 2,4-TDI and 2,6-TDI at a mass ratio of 2,4-TDI/2,6-TDI=80/20), tolidine diisocyanate (TODI), diphenylmethane diisocynate (abbreviated as "MDI"; 4,4'-, 2,4'-, or 2,2'-or a mixture thereof), polymethylenepolyphenyl polyisocyanate, carbodiimidized diphenylmethane polyisocyanate, xylylene diisocyanate (XDI), 1,5-naphthalene diisocyanate (NDI), tetramethylxylene diisocynate and the like; alicyclic diisocyanates such as isophorone diisocyanate (IPDI), hydrogenated diphenylmethane diisocyanate (hydrogenated MDI), hydrogenated xylylene diisocyanate (hydrogenated XDI), and the like; aliphatic diisocyanates such as hexamethylene diisocyanate, dimer acid diisocynate, norbornene diisocyanate, and the like. Among these, tolylene diisocyanate (TDI), tolidine diisocyanate (TODI), and hydrogenated diphenylmethane diisocyanate (hydrogenated MDI) are preferred because of excellent moldability (yield and molding irregularity) and more easy control of reactivity during a work. These may be used alone or in combination of two or more.

As the polyisocyanate (a1), for example, when the amount of diphenylmethane diisocynate (MDI) used is increased, crystallinity of the resultant polyurethane resin is excessively increased, and undesirably it tends to be difficult to improve polishing performance due to high brittleness and wear resistance. Therefore, it is desirable to set the type and amount of the polyisocyanate used with due consideration of balance with expected characteristics.

As the polyol components to be reacted with the polyisocyanate (a1), the aromatic polyester polyol (a2) and the polyether polyol (a3) are essentially used in combination, but the low-molecular-weight glycol (a4) can be further used.

The aromatic polyester polyol (a2) is produced from a dicarboxylic acid and a diol and includes a dicarboxylic acid having an aromatic skeleton and/or a diol having an aromatic skeleton as essential components. In addition, a dicarboxylic acid not having an aromatic skeleton and/or a diol not having an aromatic skeleton may be further combined.

In addition, as the aromatic polyester polyol (a2), in some cases, a polyamide polyester diol produced by combining a carboxylic acid, a diol, a diamine, and the like other than the above having an aromatic skeleton may be contained. In this case, a diamine having an aromatic skeleton can also be used.

In addition, the aromatic polyester polyol (a2) used in the present invention has 2 to 11 aromatic rings, preferably 4 to 8 aromatic rings, in its molecular chain. When the number of aromatic rings in the aromatic polyester polyol (a2) falls in this range, a polyurethane polishing pad with proper hardness can be obtained. When the number of aromatic rings in the aromatic polyester polyol (a2) is less than 2, sufficient hardness cannot be achieved. In addition, when the number of aromatic rings in the aromatic polyester polyol (a2) exceeds 11, viscosity of the prepolymer (A) is excessively increased, thereby causing poor moldability.

Examples of a dicarboxylic acid having an aromatic skeleton which can be used for producing the aromatic polyester polyol (a2) include dicarboxylic acids such as terephthalic acid, isophthalic acid, orthophthalic acid, naphthalenedicarboxylic acid, biphenyl dicarboxylic acid, 1,2-bis(phenoxy)ethane-p,p'-dicarboxylic acid, and the like. These may be used alone or in combination of two or more.

Examples of a diol having an aromatic skeleton which can be used for producing the aromatic polyester polyol (a2) include dihydroxynaphthalene, bisphenol A, bisphenol S, bisphenol AF, bisphenol $Si_2$, and alkyleneoxide adducts thereof, and the like. These may be used alone or in combination of two or more.

In addition, in producing the aromatic polyester polyol (a2), a diol not having an aromatic skeleton can be used in combination with the diol having an aromatic skeleton. Examples of the diol not having an aromatic skeleton include aliphatic diols such as ethylene glycol (EG), 1,2-propanediol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, 3-methyl-1,5-pentanediol, 2-butyl-2-ethyl-1,3-propanediol, 2-methyl-1,3-propanediol, and the like; alicyclic diols such as 1,4-cyclohexanediol, 1,4-cyclohexanedimethanol, hydrogenated bisphenol A, and the like. These may be used alone or in combination of two or more.

Examples of other raw materials which can be used for the (a2) according to demand include carboxylic acids such as succinic acid, adipic acid, azelaic acid, sebacic acid, dodecanedicarboxylic acid, maleic anhydride, fumaric acid, 1,3- cyclopentanedicarboxylic acid, 1,4-cyclohexanedicarboxylic acid, p-hydroxybenzoic acid, p-(2-hydroxyethoxy) benzoic acid, trimellitic acid, pyromellitic acid, and the like; alcohols such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, aconitic sugar, and the like; amines; and the like. These may be used, alone or in combination of two or more.

Mn of the aromatic polyester polyol (a2) is preferably set in view of the intended viscosity of the prepolymer (A) used, as the base resin. Mn of the aromatic polyester polyol (a2) is preferably in a range of 500 to 2000 and more preferably in a range of 750 to 1500. When Mn of the aromatic polyester polyol (a2) is in this range, an increase in viscosity of the prepolymer (A) used as the base resin is suppressed, thereby producing the prepolymer having the intended viscosity. When Mn of the aromatic polyester polyol (a2) is less than 500, compression set is degraded. In addition, when Mn of the aromatic polyester polyol (a2) exceeds 2000, the viscosity of the prepolymer (A) is excessively increased, thereby causing poor moldability.

In the present invention, since the aromatic polyester polyol (a2) has low molecular mobility, hardness can be imparted by a soft segment in addition to usual expression of hardness by a hard segment, thereby exhibiting higher hardness. In addition, the amount of hard segment can be controlled by controlling the amount of aromatic polyester polyol added so as to optimize balance between the hard segment and the soft segment, thereby imparting excellent elasticity and realizing lower compression set and lower brittleness.

That is, hardness can be increased due to the low molecular mobility of the aromatic polyester polyol (a2), and the amount of hard segment (for example, the MBOCA amount) can be decreased, thereby imparting elasticity, facilitating control of brittleness, and realizing lower compression set.

In addition, since the NCO content of the prepolymer (A) can be set to be low by an increase in hardness due to the low molecular mobility of the aromatic polyester polyol (a2), thereby causing the advantage of securing good moldability.

Examples of the polyether polyol (a3) include polyethylene glycol (PEG), polypropylene glycol (PPG), polyethylenepropylene glycol (PEPG), polytetramethylene glycol (PTMG), 2-methyl-1,3-propane adipate, 3-methyl-1,5-pentane adipate, polycarbonate polyol, and the like. Among these, polytetramethylene glycol (PTMG, Mn=500 to 2000) is preferred. The polyether polyol (a3) may have any one of linear, branched, and cyclic structures.

Mn of the polyether polyol (a3) is preferably in a range of 500 to 3000 and more preferably in a range of 1000 to 2000. When Mn of the polyether polyol (a3) is in this range, high hardness (high elastic modulus) and excellent brittleness control and wear resistance are achieved.

In the prepolymer (A), more preferably, the aromatic polyester polyol (a2) is phthalic acid-based polyester polyol produced using terephthalic acid, isophthalic acid, orthophthalic acid or the like as a dicarboxylic acid having an aromatic skeleton, and the polyether polyol (a3) is polytetramethylene glycol (PTMG, Mn=500 to 2000) because the intended characteristics of the present invention, such as high, hardness (high elasticity), brittleness control, fine cell control, moldability (yield and molding irregularity), high strength, low permanent set, and the like, can be more effectively achieved.

Examples of the low-molecular weight glycol (a4) include aliphatic diols such as ethylene glycol (EG), 1,2-propanediol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, 3-methyl-1,5-pentanediol, 2-butyl-2-ethyl-1,3-propanediol, 2-methyl-1,3-propanediol, and the like; alicyclic diols such as 1,4-cyclohexanediol, 1,4-cyclohexanedimethanol, hydrogenated bisphenol A, and the like; trifunctional or higher-functional hydroxyl group-containing compounds such as glycerin, trimethylolpropane, pentaerythritol, and the like. Among these, diethylene glycol (DEG) is preferred. The low-molecular weight glycol (a4) may have any one of straight-chain, branched, and cyclic structures.

The molecular weight of the low-molecular weight glycol (a4) is preferably in a range of 50 to 300 and more preferably in a range of 50 to 200. When the molecular weight of the low-molecular weight glycol (a4) is in this range, combination of (a2) to (a4) as the polyol components permits more effective control of reactivity and exhibits excellent moldability (yield and molding irregularity).

In the present invention, the prepolymer (A) as the base resin is produced by reacting the polyisocyanate (a1) with combination of the aromatic polyester polyol (a2) and the polyether polyol (a3) as the polyol components, but reaction may be performed by further combining the low-molecular weight glycol (a4). When the two-component urethane resin composition is foamed, cured, and molded, use of the prepolymer (A) produced by combining (a2) to (a4) as the base resin can facilitate the control of reactivity, has a more effect on improvement in workability, and permits the formation of foam cells having uniform fine shape and the achievement of excellent cell controllability and moldability (yield and molding irregularity) and both particularly high strength and low permanent set.

In synthesizing the prepolymer (A), reaction can be performed using, as the polyol components, the aromatic polyester polyol (a2) and the polyether polyol (a3) at a mass ratio of preferably in a range of (a2)/(a3)=5/95 to 70/30, more preferably in a range of 30/70 to 60/40. The mass ratio of (a2) to (a3) during reaction is preferably in this range because an increase in viscosity of the polyisocyanate (a1) can be suppressed, reactivity during the work can be easily controlled, and balance between the hard segment and the soft segment can be easily optimized.

In addition, when the low-molecular weight glycol (a4) is used for synthesizing the prepolymer (A), reaction can be performed using, as the polyol components, the aromatic polyester polyol (a2), the polyether polyol (a3), and the low-molecular weight glycol (a4) at a mass ratio of preferably in a range of ((a2)+(a3))/(a4)=100/1 to 100/20, more preferably in a range of 100/3 to 100/12. The mass ratio of (a2) and (a3) to (a4) during reaction is preferably in this range because an increase in viscosity of the polyisocyanate (a1) can be suppressed, reactivity during the work can be easily controlled, and balance between the hard segment and the soft segment can be easily optimized. The mass ratio ((a2)+(a3))/(a4) of less than 100/1 is undesired because the effect on control of working reactivity is decreased. In addition, the mass ratio of over 100/20 is undesired because the viscosity of the prepolymer (A) is excessively increased, and thus moldability is deteriorated.

In synthesizing the prepolymer (A), the molar ratio of isocyanate groups of the polyisocyanate (a1) to a total of hydroxyl groups of (a2) to (a4) (i.e., NCO/OH molar ratio) is preferably in a range of 1.60 to 3.50.

Next, the curing agent mixed in combination with the base resin is described below.

The curing agent used in the present invention may contain water (C) serving as a foaming agent and a catalyst (D)

together with the isocyanate group reactive compound (B) (hereinafter abbreviated as the "reactive compound (B)") used as an essential component.

The reactive compound (B) is not particularly limited as long as it has good reactivity to a compound having an isocyanate group, but, for example, a polyaminochlorophenylmethane compound, Pandex E-50 (trade name: manufactured by DIC Corporation, polyaminochlorophenylmethane compound), a mixture of polyaminochlorophenylmethane compound and polyol (for example, polytetramethylene glycol or the like), and the like can be used. These can be used alone or in combination or two or more. The polyaminochlorophenylmethane compound contains 50% by weight or more of 4,4'-diamino-3,3'-dichlorodiphenylmethane (hereinafter referred to as "MBOCA") which, is a binuclear compound. The compound preferably contains 50 to 90% by weight of MBOCA and 50 to 20% by weight of a trinuclear or higher-nuclear compound, and a mixture of 50 to 70% by weight of MBOCA which is a binuclear compound, 20 to 4 0% by weight of a trinuclear compound, and 5 to 10% by weight of a tetranuclear or higher-nuclear compound can be preferably used. These compounds are preferably dissolved in polyol.

The amount of the reactive compound (B) mixed is preferably in a range of 15 to 80 parts by mass, more preferably 20 to 55 parts by mass, based on 100 parts by mass of the prepolymer (A). When the amount of the reactive compound (B) mixed is in this range, a polyurethane polishing pad having high hardness and excellent wear resistance can be produced.

The water (C) is mixed for achieving the function of the foaming agent in a water foaming method. The amount of water mixed is generally preferably in a range of 0.05 to 1 part by mass, more preferably in a range of 0.30 to 0.60 part by mass, based on 100 parts by mass of the reactive compound (B). When the amount of the water (C) mixed is in this range, a polishing pad having a stable foam state can be produced.

When the two components, the base resin and the curing agent, are mixed, a method for adding the water (C) is not particularly limited but, for example, a method of mixing the reactive compound (B), the water (C), the catalyst (D), and, if required, additives to prepare the curing agent, and then mixing the base resin and the curing agent and foaming and curing the resultant mixture can be used.

Further, if required, the catalyst (D) may be mixed with the two-component urethane resin composition for a polishing pad of the present invention.

The type and amount of the catalyst (D) added may be selected in view of the time required from mixing of the catalyst and casting in a mold, the temperature, the final foam state, and the like, and are not particularly limited.

Examples of the catalyst (D) include, but are not particularly limited to, tertiary amine catalysts such as N,N-dimethylaminoethyl ether, Toyocat DT (trade name, manufactured by Tosoh Corporation, N,N-dimethylaminoethyl ether), triethylenediamine, dimethylethanolamine, triethanolamine, N,N,N',N'-tetramethylhexamethylenediamine, N-methylimidazole, and the like; metal catalysts such as dioctyltin laurate, and the like. Among these, N,N-dimethylaminoethyl ether and Toyocat ET are preferred because of strong foaming properties, and these may be used alone or in combination of two or more.

The amount of the catalyst (D) mixed is preferably in a range of 0.1 to 1 part by mass, more preferably in a range of 0.3 to 0.6 part by mass, based on 100 parts by mass of the reactive compound (B). When the amount of the catalyst (D) mixed is in this range, a polishing pad having a stable foam state can be produced.

The curing agent can be prepared by mixing the water (C), the catalyst (D), etc. as components to be contained in the above-described respective ranges of mixing amounts together with the reactive compound (B).

The base resin and the curing agent prepared as described above are combined and immediately sufficiently mixed to produce the two-component urethane resin composition for a polishing pad of the present invention.

In order to produce the two-component urethane resin composition for a polishing pad of the present invention, the mixing ratio of the base resin to the curing agent, that is [total number of moles of isocyanate groups in prepolymer (A) as the base resin]/[total number of moles of groups reactive to isocyanate groups in curing agent including reactive compound (B) and water (C)], is preferably in a range of 1/0.7 to 1/1.1, more preferably in a range of 1/0.8 to 1/1.0. When the mixing ratio of the base resin to the curing agent is in this range, high hardness and excellent wear resistance can be achieved.

In the two-component urethane resin composition for a polishing pad of the present invention, known usual additives, for example, a foam stabilizer, an antioxidant, a de-foaming agent, an ultraviolet absorber, abrasive grains, a filler, a pigment, a thickener, a surfactant, a flame retardant, a plasticizer, a lubricant, an antistatic agent, a heat-resistant stabilizer, a blend resin, and the like, can be used in any one of the production processes within a range in which the objects of the present, invention are not inhibited. In addition, the additives described, in the present, invention are only examples, and the types of the additives are not particularly limited.

The foaming agent is not particularly limited as long as fine cells can be stably formed, and examples thereof include silicon surfactants such as Toray Silicone SH-193 (manufactured by Dow Corning Toray Silicone Co., Ltd.), SH-192 (manufactured by the same), SH-190 (manufactured by the same), and the like.

Examples of the filler include carbonates, silicic acid, silicates, hydroxides, sulfates, borates, titanates, metal oxides, carbon materials, organic materials, and the like.

Next, the polyurethane polishing pad and the method for producing the same of the present invention are described below.

The polyurethane polishing pad of the present invention is produced using the two-component urethane resin composition for a polishing pad by, for example, mixing the above-described additives with the two-component urethane resin composition for a polishing pad according to demand, injecting the resultant mixture into a mold with a predetermined shape and foaming and curing the mixture, removing the foamed product from, the mold, and then slicing the foamed product into a proper shape such as a sheet-like shape.

The method for producing the polyurethane polishing pad of the present invention is not particularly limited, and for example, a known usual method such as a method of adding hollow beads, a mechanical foaming method, a chemical, foaming method, or the like, other than the above-described water foaming method, can be used.

For example, when the chemical foaming method is described as the method for producing the polyurethane polishing pad of the present invention, a series of production processes including [Step 1] to [Step 5] can be described with an example.

If the additives can be added without hindrance and uniform blending and mixing can be performed without hindrance, any desired method may be selected in any one of the steps without hindrance.

[Step 1] Step of Preparing Base Resin

In a reactor provided with a nitrogen inlet tube, a cooling condenser, a thermometer, and a cooling device, for example, tolylenediisocyanate (TDI) as the polyisocyanate (a1) and a polyester polyol, which is composed of neopentyl glycol and orthophthalic acid, as the aromatic polyester polyol (a2) and polytetramethylene glycol as the polyether polyol (a3) are charged and subjected to reaction under stirring in a nitrogen atmosphere preferably in the range of 70° C. to 90° C., more preferably in the range of 75° C. to 85° C., to synthesize the prepolymer (A), thereby preparing the base resin containing the prepolymer (A).

The isocyanate group equivalent of the prepolymer (A) is preferably in the range of 250 to 700. The number-average molecular weight (Mn) of the aromatic polyester polyol (a2) used for synthesizing the prepolymer (A) is preferably in the range of 500 to 2000, and the mass ratio of the aromatic polyester polyol (a2) to the polyether polyol (a3) during reaction is preferably in the range of (a2/a3)=5/95 to 70/30.

[Step 2] Step of Mixing Base Resin and Curing Agent

Next, the base resin containing the prepolymer (A) is mixed with the curing agent containing at least the reactive compound (B), the water (C), and the catalyst (D), and the resultant mixture is stirred to prepare a foaming reaction solution.

During mixing, the base resin containing the prepolymer (A) and the curing agent containing the reactive compound (B) which contains the water (C) and the catalyst (D) are placed in respective tanks of a two-component mixing-casting machine, and the base resin containing the prepolymer (A) and the curing agent are preferably heated to 40° C. to 70° C. and 40° C. to 90° C., respectively, and mixed, in the two-component mixing-casting machine.

[Step 3] Casting Step

The foaming reaction solution is injected into a mold preferably previously heated to 50° C. to 120° C.

[Step 4] Curing Step

In a state of being injected into the mold, the foaming reaction solution is foamed and cured by heating and maintaining in a proper temperature range (for example, in a range of 50° C. to 120° C.), allowed to stand in the mold preferably at 50° C. to 120° C. for 30 minutes to 2 hours, removed from, the mold, and then subjected to after curing preferably at 100° C. to 120° C. for 8 to 17 hours to produce a molded product.

[Step 5] Slicing Step

The molded product is sliced into a sheet having a proper thickness. The sheet thickness after slicing is not particularly limited but may be set according to purposes of polishing, and is preferably, for example, in a range of 0.6 to 2.0 mm.

As described above, the polyurethane polishing pad according to the present invention exhibits a small change in hardness (elastic modulus) of the polishing pad due to a temperature rise during a polishing operation, low permanent set, and excellent wear resistance, moldability (yield, molding irregularity), and brittleness control, and is useful for uniform high-precision polishing of glass products which are required to have a high degree of surface flatness and in-plane uniformity, for example, a liquid crystal display (LCD) glass substrate, a hard disk (HDD) glass substrate, a display glass substrate, a recording device glass disk, an optical lens, a silicon wafer, a semiconductor device and the like.

EXAMPLES

Although the present invention is described in further detail below with reference to examples, the scope of the present invention is not limited only to these examples.

Also, in the present invention, "parts" is "parts by mass" and "%" is "% by mass" unless otherwise specified.

In addition, the measurement, method, and evaluation method used in the present invention are as follows.

[Method for Measuring Isocyanate Group Equivalent (NCO Equivalent) of Prepolymer (A)]

The NCO equivalent of the prepolymer (A) was measured by dissolving a sample in dry toluene, adding an excessive amount of di-n-butylamine solution and reacting with the sample, and determining the remaining di-n-butylamine by back titration with a hydrochloric acid standard solution.

[Method for Forming Polishing Pad]

The base resin containing the prepolymer (A) and the curing agent containing the reactive compound (B) containing the water (C) and the catalyst (D) were placed in respective tanks of a two-component mixing-casting machine, and the base resin and the curing agent were heated to 50° C. to 80° C. and 40° C. to 110° C., respectively, and mixed in the two-component mixing-casting machine to prepare a foaming reaction solution.

The prepared foaming reaction solution was injected into a mold previously heated to 50° C. to 120° C. In a state of being injected into the mold, the foaming reaction solution was foamed and cured by heating and maintaining in a proper temperature range (for example, in a range of 50° C. to 120° C.), allowed to stand in the mold preferably at 50° C. to 120° C. for 30 minutes to 2 hours, removed from the mold, and then subjected to after curing preferably at 100° C. to 120° C. for 8 to 17 hours to produce a molded product.

The molded product was sliced into a sheet, having a proper thickness. The sheet thickness after slicing is not particularly limited, but may be set according to purposes of polishing, and is preferably, for example, in a range of 0.6 to 2.0 mm.

[Method for Measuring Reactivity (Pot Life) of Prepolymer (A)]

The base resin containing the prepolymer (A) and the reactive compound (B) were adjusted to internal temperatures of 80° C. and 50° C., respectively, and then the time $T_1$ (unit: second) required until the viscosity of an urethane resin composition reached 50000 mPa·s from time $T_0$ as a base point where the urethane resin composition was prepared by mixing the base resin and the reactive compound (B) was measured to measure reactivity as the pot life of the urethane resin composition.

In addition, the viscosity of the urethane resin composition was measured in a sample amount of 200 ml at intervals of 10 seconds using a BM-type viscometer (manufactured by Tokyo Keiki Inc.) with a No. 4 rotor in a constant-temperature water bath set to a temperature of 23° C.

[Method for Measuring Moldability]

The base resin containing the prepolymer (A) and the curing agent containing the reactive compound (B) containing the water (C) and the catalyst (D) were placed in respective tanks of a two-component mixing-casting machine, and the base resin and the curing agent were heated to 50° C. to 80° C. and 40° C. to 110° C., respectively, mixed in the two-component mixing-casting machine, and injected in a mold with an open upper surface and foamed at room temperature. In visual observation of a foam state, when no crack or expansion of the lower surface of a foam occurred, moldability was determined as "good", while when crack or expansion of the lower surface of a foam occurred, moldability was determined as "poor".

[Method for Measuring Wear Resistance]

Wear resistance was evaluated according to JIS K 7312-1996 (taper abrasion test). As criteria for evaluating wear resistance, when an abrasion loss was 200 mg or less, wear resistance was determined as "good", while when an abrasion loss exceeded 200 mg, wear resistance was determined as "poor".

[Method for Measuring Elongation]

Elongation was evaluated using a No. 3 dumbbell test piece with a line spacing of 20 mm at a test rate of 500 mm/min and a measurement temperature of 23° C. according to JIS K 7312-1996 (tensile test). As criteria for evaluating elongation, when an elongation exceeded 150%, the elongation was determined as "good", while when an elongation was less than 150%, the elongation was determined as "poor".

[Method for Measuring Compression Set]

Compression set was evaluated at a test temperature of 70° C. for a test time of 22 hours according to JIS K 7312-1996 (compression set test). As criteria for evaluating compression set, a compression set of 60% or less was determined as "good", while a compression set of 60% or more was determined as "poor".

[Method for Measuring Hardness (JIS A)]

Hardness was evaluated, by a spring hardness test, type A, according to JIS K 7312-1996 (hardness test). As criteria for evaluating hardness, a hardness of 85 (JIS A) or more was determined as "good", while a hardness of 85 (JIS A) or less was determined as "poor".

[Method for Measuring Density]

A density was calculated by dividing a foam weight by a foam volume ($kg/m^3$).

Example 1

<<Production of Polyurethane Polishing Pad (P-1)>>

In a 1 L four-necked round-bottom flask provided with a nitrogen inlet tube, a cooling condenser, a thermometer, and a stirrer, 42.5 parts of toluene diisocyanate (trade name: Cosmonate T-100, manufactured by Mitsui Chemicals Polyurethane Co., Ltd.) as the polyisocyanate (a1) was charged, and stirring was started.

Next, 50 parts of polytetramethylene glycol (trade name: PTMG-1000, manufactured by Mitsubishi Chemical Corporation, Mn=1000) as the polyether polyol (a3) and 50 parts of polyester polyol (Mn=1000) as the aromatic polyester polyol (a2), which was produced from neopentyl glycol and orthophthalic acid, were charged in divided amounts and mixed, followed by reaction at 60° C. for 8 hours in a nitrogen stream to prepare an isocyanate group-terminated urethane prepolymer (A-1) having an isocyanate group equivalent of 500.

Next, 100 parts of polyaminochlorophenylmethane compound (trade name: Pandex E-50, manufactured by DIC Corporation) as the isocyanate group reactive compound (B-1) was mixed with 0.9 part of Toray Silicone SH-193 as a foam stabilizer, and the resultant mixture was sufficiently stirred and mixed to prepare a polyamine composition as a curing agent. Then, in a vessel, the prepolymer (A-1) as the base resin was vigorously stirred for about 1 minute with a stirring blade at a rotational speed of 1200 rpm so that air bubbles were taken in the reaction system. Then, the polyamine composition as the curing agent was added to the prepolymer (A-1) as the base resin at a mass ratio of base resin [prepolymer (A-1)]/curing agent [polyamine composition]=100/32, and the resultant mixture was again vigorously continuously stirred for about 3 minutes with a stirring blade at a rotational speed of 1200 rpm so that air bubbles were trapped in the reaction system. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded, product (Y-1).

The molded product (Y-1) was cut into a thickness of 2 mm with a slicer, forming a sheet-like polyurethane polishing pad (P-1) of the present invention.

The polyurethane polishing pad (P-1) of the present invention had excellent physical properties as shown in Table 1.

Example 1

<<Production of Polyurethane Polishing Pad (P-2)>>

In a 1 L four-necked round-bottom flask provided with a nitrogen inlet tube, a cooling condenser, a thermometer, and a stirrer, 42.5 parts of toluene diisocyanate (trade name: Cosmonate T-100, manufactured by Mitsui Chemicals Polyurethane Co., Ltd.) as the polyisocyanate (a1) was charged, and stirring was started.

Next, 50 parts of polytetramethylene glycol (trade name: PTMG-1000, manufactured by Mitsubishi Chemical Corporation, Mn=1000) as the polyether polyol (a3) and 50 parts of polyester polyol (Mn=1000) as the aromatic polyester polyol (a2), which was produced from neopentyl glycol and orthophthalic acid, were charged in divided amounts and mixed, followed by reaction at 60° C. for 8 hours in a nitrogen stream to prepare an isocyanate group-terminated urethane prepolymer (A-2) having an isocyanate group equivalent of 500.

Next, 100 parts of polyaminochlorophenylmethane compound (trade name: Pandex E-50, manufactured by DIC Corporation) as the isocyanate group reactive compound (B-2) was mixed with 0.5 part of ion-exchange water as the water (C) serving as a foaming agent, 0.3 part of N,N-dimethylaminoethyl ether (trade name: TOYOCAT-ET, manufactured by Toson Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-2) as the base resin and the polyamine composition as the curing agent were stirred and mixed at a mass ratio of base resin [prepolymer (A-2)]/curing agent [polyamine composition]=100/32. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-2).

The molded product (Y-2) was cut to a thickness of 2 mm with a slicer, forming a sheet-like polyurethane polishing pad (P-2) of the present invention.

The polyurethane polishing pad (P-2) of the present invention had excellent physical properties as shown in Table 1.

Example 3

<<Production of Polyurethane Polishing Pad (P-3)>>

In a 1 L four-necked round-bottom flask provided with a nitrogen inlet tube, a cooling condenser, a thermometer, and a stirrer, 42.5 parts of toluene diisocyanate (trade name: Cosmonate T-100, manufactured by Mitsui Chemicals Polyurethane Co., Ltd.) and 4.6 parts of dicyclohexylmethane diisocyanate (manufactured, by Sumika Bayer Urethane Co., Ltd.) were charged as the polyisocyanate (a1), and stirring was started.

Next, 50 parts of polytetramethylene glycol (trade name: PTMG-1000, manufactured by Mitsubishi Chemical Corporation, Mn=1000) as the polyether polyol (a3) and 50 parts of polyester polyol (Mn=1000) as the aromatic polyester polyol (a2), which was produced from neopentyl glycol and orthophthalic acid, were charged in divided amounts and mixed, followed by reaction at 60° C. for 8 hours in a nitrogen stream to prepare an isocyanate group-terminated urethane prepolymer (A-3) having an isocyanate group equivalent of 500.

Next, 100 parts of polyaminochlorophenylmethane compound (trade name: Pandex E-50, manufactured by DIC Corporation) as the isocyanate group reactive compound (B-3) was mixed with 0.5 part of ion-exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-3) as the base resin and the polyamine composition as the curing agent were stirred and mixed at a mass ratio of base resin [prepolymer (A-3)]/curing agent [polyamine composition]=100/32. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-3).

The molded product (Y-3) was cut to a thickness of 2 mm with a slicer, forming a sheet-like polyurethane polishing pad (P-3) of the present invention.

The polyurethane polishing pad (P-3) of the present invention had excellent physical properties as shown in Table 1.

Example 4

<<Production of Polyurethane Polishing Pad (P-4)>>

In a 1 L four-necked round-bottom flask provided with a nitrogen inlet tube, a cooling condenser, a thermometer, and a stirrer, 57.4 parts of toluene diisocyanate (trade name: Cosmonate T-100, manufactured by Mitsui Chemicals Polyurethane Co., Ltd.) as the polyisocyanate (a1) was charged, and stirring was started.

Next, 60 parts of polytetramethylene glycol (trade name: PTMG-1000, manufactured by Mitsubishi Chemical Corporation, Mn=1000) as the polyether polyol (a3), 40 parts of polyester polyol (Mn=1000) as the aromatic polyester polyol (a2) composed of a bisphenol A alkylene oxide adduct, terephthalic acid, isophthalic acid, and orthophthalic acid, and 6.8 parts of diethylene glycol (DEG, manufactured by Mitsubishi Chemical Corporation) as the low-molecular weight glycol (a4) were charged in divided amounts and mixed, followed by reaction at 60° C. for 8 hours in a nitrogen stream to prepare an isocyanate group-terminated urethane prepolymer (A-4) having an isocyanate group equivalent of 500.

Next, 100 parts of polyaminochlorophenylmethane compound (trade name: Pandex E-50, manufactured by DIC Corporation) as the isocyanate group reactive compound (B-4) was mixed with 0.5 part of ion-exchange water as the water (C) serving as a foaming agent, 0.3 part of N,N-dimethylaminoethyl ether (trade name: TOYOCAT-ET, manufactured by Toson Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-4) as the base resin and the polyamine composition as the curing agent were stirred and mixed at a mass ratio of base resin [prepolymer (A-4)]/curing agent [polyamine composition]=100/32. Then, 350 g of the mixture was injected into a mold. (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-4).

The molded product (Y-4) was cut to a thickness of 2 mm with a slicer, forming a sheet-like polyurethane polishing pad (P-4) of the present invention.

The polyurethane polishing pad (P-4) of the present invention had excellent physical properties as shown in Table 1.

Example 5

<<Production of Polyurethane Polishing Pad (P-5)>>

In a 1 L four-necked round-bottom flask provided with a nitrogen inlet tube, a cooling condenser, a thermometer, and a stirrer, 50.0 parts of toluene diisocyanate (trade name: Cosmonate T-100, manufactured by Mitsui Chemicals Polyurethane Co., Ltd.) as the polyisocyanate (a1) was charged, and stirring was started.

Next, 70 parts of polytetramethylene glycol (trade name: PTMG-1000, manufactured by Mitsubishi Chemical Corporation, Mn=1000) as the polyether polyol (a3) and 30 parts of polyester polyol (Mn=1000) as the aromatic polyester polyol (a2), which was produced from neopentyl glycol and orthophthalic acid, were charged in divided amounts and mixed, followed by reaction at 60° C. for 8 hours in a nitrogen stream to prepare an isocyanate group-terminated urethane prepolymer (A-5) having an isocyanate group equivalent of 400.

Next, 100 parts of polyaminochlorophenylmethane compound (trade name: Pandex E-50, manufactured by DIC Corporation) as the isocyanate group reactive compound (B-5) was mixed with 0.5 part of ion-exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-5) as the base resin and the polyamine composition as the curing agent were stirred and mixed at a mass ratio of base resin [prepolymer (A-5)]/curing agent [polyamine composition]=100/40. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-5).

The molded product (Y-5) was cut to a thickness of 2 mm with a slicer, forming a sheet-like polyurethane polishing pad (P-5) of the present invention.

The polyurethane polishing pad (P-5) of the present invention had excellent physical properties as shown in Table 1.

Example 6

<<Production of Polyurethane Polishing Pad (P-6)>>

In a 1 L four-necked round-bottom flask provided with a nitrogen inlet tube, a cooling condenser, a thermometer, and a stirrer, 37.3 parts of toluene diisocyanate (trade name: Cosmonate T-100, manufactured by Mitsui Chemicals Polyurethane Co., Ltd.) as the polyisocyanate (a1) was charged, and stirring was started.

Next, 50 parts of polytetramethylene glycol (trade name: PTMG-1000, manufactured by Mitsubishi Chemical Corporation, Mn=1000) as the polyether polyol (a3) and 50 parts of polyester polyol (Mn=1000) as the aromatic polyester polyol (a2), which was produced from neopentyl glycol and orthophthalic acid were, charged in divided amounts and mixed, followed by reaction at 60° C. for 8 hours in a nitrogen stream to prepare an isocyanate group-terminated urethane prepolymer (A-6) having an isocyanate group equivalent of 600.

Next, 100 parts of polyaminochlorophenylmethane compound (trade name: Pandex E-50, manufactured by DIC Corporation) as the isocyanate group reactive compound (B-6) was mixed with 0.5 part of ion-exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-6) as the base resin and the polyamine composition as the curing agent were stirred and mixed at a mass ratio of base resin [prepolymer (A-6)]/curing agent [polyamine composition]=100/27. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-6).

The molded product (Y-6) was cut to a thickness of 2 mm with a slicer, forming a sheet-like polyurethane polishing pad (P-6) of the present invention.

The polyurethane polishing pad (P-6) of the present invention had excellent physical properties as shown in Table 1.

Comparative Example 1

<<Production of Polyurethane Polishing Pad (P-7)>>

In a 1 L four-necked round-bottom flask provided with a nitrogen inlet tube, a cooling condenser, a thermometer, and a stirrer, 47.7 parts of toluene diisocyanate (trade name: Cosmonate T-80, manufactured by Mitsui Chemicals Polyurethane Co., Ltd.) as the polyisocyanate (a1) was charged, and stirring was started.

Next, without using the aromatic polyester polyol (a2), 40.8 parts of polytetramethylene glycol (trade name: PTMG-1000, manufactured by Mitsubishi Chemical Corporation, Mn=1000) as the polyether polyol (a3) and 11.5 parts of diethylene glycol (DEG, manufactured by Mitsubishi Chemical Corporation) as the low-molecular weight glycol (a4) were charged in divided amounts and mixed, followed, by reaction at 60° C. for 8 hours in a nitrogen stream to prepare a prepolymer (A-7) having an isocyanate group equivalent of 400.

Next, 100 parts of polyaminochlorophenylmethane compound (trade name: Pandex E-50, manufactured by DIC Corporation) as the isocyanate group reactive compound (B-7) was mixed, with 0.5 part of ion exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-7) as the base resin and the polyamine composition as the curing agent, were stirred and mixed at a mass ratio of base resin [prepolymer (A-7)]/curing agent [polyamine composition]=100/40. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-7).

The molded product (Y-7) was cut to a thickness of 2 mm with a slicer, forming a sheet-like polyurethane polishing pad (P-7).

The polyurethane polishing pad (P-7) produced in Comparative Example 1 had poor compression set and brittleness (elongation) as shown in Table 2.

Comparative Example 2

<<Production of Polyurethane Polishing Pad (P-8)>>

In a 1 L four-necked round-bottom flask provided with a nitrogen inlet tube, a cooling condenser, a thermometer, and a stirrer, 42.5 parts of toluene diisocyanate (trade name: Cosmonate T-100, manufactured by Mitsui Chemicals Polyurethane Co., Ltd.) as the polyisocyanate (a1) was charged, and stirring was started.

Next, without using the polyether polyol (a3), 100 parts of polyester polyol (Mn=1000) as the aromatic polyester polyol (a2) composed of neopentyl glycol and orthophthalic acid was charged in divided amounts and mixed, followed by reaction at 60° C. for 8 hours in a nitrogen stream to prepare a prepolymer (A-6) having an isocyanate group equivalent of 500.

Next, 100 parts of polyaminochlorophenylmethane compound (trade name: Pandex E-50, manufactured by DIC Corporation) as the isocyanate group reactive compound (B-8) was mixed with 0.5 part of ion-exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-8) as the base resin and the polyamine composition as the curing agent were stirred and mixed at a mass ratio of base resin [prepolymer (A-8)]/curing agent [polyamine composition]=100/32. The prepolymer (A-8) in the resultant mixture had excessively high viscosity, and thus a molded product (Y-8) and a polishing pad (P-8) could not be formed and not be evaluated. The results of Comparative Example 2 are summarized in Table 2.

Comparative Example 3

<<Production of Polyurethane Polishing Pad (P-9)>>

In a 1 L four-necked round-bottom flask provided with a stirrer, 83.0 parts of toluene diisocyanate (trade name: Cosmonate T-100, manufactured by Mitsui Chemicals Polyurethane Co., Ltd.) as the polyisocyanate (a1) was charged, and stirring was started.

Next, 50 parts of polytetramethylene glycol (trade name: PTMG-1000, manufactured by Mitsubishi Chemical Corporation, Mn=1000) as the polyether polyol (a3) and 50 parts of polyester polyol (Mn=1000) as the aromatic polyester polyol (a2) composed of neopentyl glycol and orthophthalic acid were charged in divided amounts and mixed, followed by reaction at 60° C. for 8 hours in a nitrogen stream to prepare an isocyanate group-terminated urethane prepolymer (A-9) having an isocyanate group equivalent of 245.

Next, 100 parts of polyaminochlorophenylmethane compound (trade name: Pandex E-50, manufactured by DIC Corporation) as the isocyanate group reactive compound (B-9) was mixed with 0.5 part of ion-exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-9) as the base resin and the polyamine composition as the curing agent were stirred and mixed at a mass ratio of base resin [prepolymer (A-9)]/curing agent [polyamine composition]=100/32. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-9).

Although the results of Comparative Example 3 are shown in Table 2, cracking of the molded product and expansion at the lower surface of a foam occurred, and a good sheet-like polyurethane polishing pad (P-9) could not be produced.

Comparative Example 4

<<Production of Polyurethane Polishing Pad (P-10)>>

In a 1 L four-necked round-bottom flask provided with a nitrogen inlet tube, a cooling condenser, a thermometer, and a stirrer, 42.5 parts of toluene diisocyanate (trade name: Cosmonate T-100, manufactured by Mitsui Chemicals Polyurethane Co., Ltd.) as the polyisocyanate (a1) was charged, and stirring was started.

Next, 97 parts of polytetramethylene glycol (trade name: PTMG-1000, manufactured by Mitsubishi Chemical Corporation, Mn=1000) as the polyether polyol (a3) and 3 parts of polyester polyol (Mn=1000) as the aromatic polyester polyol (a2) composed of neopentyl glycol and orthophthalic acid were charged in divided amounts and mixed, followed by reaction at 60° C. for 8 hours in a nitrogen stream to prepare an isocyanate group-terminated urethane prepolymer (A-10) having an isocyanate group equivalent of 500.

Next, 100 parts of polyaminochlorophenylmethane compound (trade name: Pandex E-50, manufactured by DIC Corporation) as the isocyanate group reactive compound (B-10) was mixed with 0.5 part of ion-exchange water as the water (C) serving as a foaming agent, 0.3 part of N,N-dimethylaminoethyl ether (trade name: TOYOCAT-ET, manufactured by Tosoh Corporation) as the catalyst (D), and 0.9 part of Toray Silicone SH-193 as a foam stabilizer, and the resultant mixture was sufficiently stirred and mixed to prepare a polyamine composition as a curing agent.

Then, in a vessel, the prepolymer (A-10) as the base resin and the polyamine composition as the curing agent were stirred and mixed at a mass ratio of base resin [prepolymer (A-10)]/curing agent [polyamine composition]=100/32. Then, 350 g of the mixture was injected into a mold (130 mm×130 mm×35 mm) previously heated to 50° C., immediately the mold was covered and allowed to stand at 110° C. for 1 hour, and then the foamed product was removed and subjected to after curing at 110° C. for 16 hours to prepare a molded product (Y-10). The molded product was cut to a thickness of 2 mm with a slicer, forming a sheet-like polyurethane polishing pad (P-10) of the present invention.

The polyurethane polishing pad (P-10) produced in Comparative Example 4 exhibited poor hardness as shown in Table 2.

As the tolylene diisocyanate used in the examples and the comparative examples, "TDI-100" is 2,4-toluene diisocynate, and "TDI-80" is a mixture of 2,4-toluene diisocyanate and 2,6-toluene diisocyanate at a mass ratio of 2,4-TDI/2,6-TDI=80/20.

TABLE 1

| Table 1-1 | Example 1 | Example 2 | Example 3 | Example 4 |
|---|---|---|---|---|
| Base resin: prepolymer (A) | A-1 | A-2 | A-3 | A-4 |
| NCO equivalent of prepolymer (A) | 500 | 500 | 500 | 500 |
| Viscosity of prepolymer (A) (mPa · s/80° C.) | 1560 | 1560 | 1840 | 2290 |
| Content of aromatic polyester polyol (a2) in prepolymer (A) (%) | 34 | 34 | 33 | 24 |
| Mass ratio of aromatic polyester polyol (a2) to polyether polyol (a3) (a2)/(a3) mass ratio | 50/50 | 50/50 | 50/50 | 40/60 |
| Number of aromatic rings in molecular chain of aromatic polyester polyol (a2) | 5 | 5 | 5 | 7 |
| Curing agent: polyamine composition (parts) | B-1 | B-2 | B-3 | B-4 |
| NCO group reactive compound (B) | Pandex E-50 100 parts | Pandex E-50 100 parts | Pandex E-50 100 parts | Pandex E-50 100 parts |
| Ion-exchange water (C) | Not used | 0.6 part | 0.6 part | 0.6 part |
| Catalyst (D) | Not used | TOYOCAT-ET 0.5 part | TOYOCAT-ET 0.5 part | TOYOCAT-ET 0.5 part |
| Foam stabilizer | Toray Silicone SH-193 0.9 part | Toray Silicone SH-193 0.9 part | Toray Silicone SH-193 0.9 part | Toray Silicone SH-193 0.9 part |
| Mixing ratio of base resin (prepolymer (A))/curing agent (polyamine composition) (mass ratio) | 100/32 | 100/32 | 100/32 | 100/32 |
| Pot life of urethane resin composition (seconds) | 300 | 300 | 360 | 320 |
| Density of molded product (g/m³) | 0.70 | 0.51 | 0.52 | 0.52 |
| Determination of hardness | Good | Good | Good | Good |
| Hardness of molded product (JIS A method) | 99 | 91 | 96 | 90 |
| Determination of moldability | Good | Good | Good | Good |
| Polishing pad (P) | P-1 | P-2 | P-3 | P-4 |
| Determination of wear resistance | Good | Good | Good | Good |
| Wear loss (mg) | 121 | 92 | 112 | 128 |
| Determination of elongation | Good | Good | Good | Good |

TABLE 1-continued

| Table 1-1 | Example 1 | Example 2 | Example 3 | Example 4 |
|---|---|---|---|---|
| Elongation (%) | 230 | 230 | 233 | 200 |
| Determination of permanent set | Good | Good | Good | Good |
| Permanent set (%) | 53 | 27 | 35 | 49 |

TABLE 2

| Table 1-2 | Example 5 | Example 6 |
|---|---|---|
| Base resin: prepolymer (A) | A-5 | A-6 |
| NCO equivalent of prepolymer (A) | 400 | 600 |
| Viscosity of prepolymer (A) (mPa·s/80° C.) | 1230 | 1920 |
| Content of aromatic polyester polyol (a2) in prepolymer (A) (%) | 20 | 37 |
| Mass ratio of aromatic polyester polyol (a2) to polyether polyol (a3) (a2)/(a3) mass ratio | 30/70 | 50/50 |
| Number of aromatic rings in molecular chain of aromatic polyester polyol (a2) | 5 | 5 |
| Curing agent: polyamine composition (parts) | B-5 | B-6 |
| NCO group reactive compound (B) | Pandex E-50 100 parts | Pandex E-50 100 parts |
| Ion-exchange water (C) | 0.6 part | 0.6 part |
| Catalyst (D) | TOYOCAT-ET 0.5 part | TOYOCAT-ET 0.5 part |
| Foam stabilizer | Toray Silicone SH-193 0.9 part | Toray Silicone SH-193 0.9 part |
| Mixing ratio of base resin (prepolymer (A))/curing agent (polyamine composition) (mass ratio) | 100/40 | 100/27 |
| Pot life of urethane resin composition (seconds) | 190 | 330 |
| Density of molded product (g/m$^3$) | 0.50 | 0.51 |
| Determination of hardness | Good | Good |
| Hardness of molded product (JIS A method) | 91 | 87 |
| Determination of moldability | Good | Good |
| Polishing pad (P) | P-5 | P-6 |
| Determination of wear resistance | Good | Good |
| Wear loss (mg) | 168 | 84 |
| Determination of elongation | Good | Good |
| Elongation (%) | 180 | 280 |
| Determination of permanent set | Good | Good |
| Permanent set (%) | 48 | 36 |

TABLE 3

| Table 1-3 | Comparative Example 1 | Comparative Example 2 | Comparative Example 3 | Comparative Example 4 |
|---|---|---|---|---|
| Base resin: prepolymer (A) | A-7 | A-8 | A-9 | A-10 |
| NCO equivalent of prepolymer (A) | 400 | 500 | 245 | 500 |
| Viscosity of prepolymer (A) (mPa·s/80° C.) | 820 | 6200 | 870 | 610 |
| Content of aromatic polyester polyol (a2) in prepolymer (A) (%) | 0 | 67.7 | 24 | 0 |
| Mass ratio of aromatic polyester polyol (a2) to polyether polyol (a3) (a2)/(a3) mass ratio | 0/100 | 100/0 | 50/50 | 3/97 |
| Number of aromatic rings in molecular chain of aromatic polyester polyol (a2) | — | 5 | 5 | 7 |
| Curing agent: polyamine composition (parts) | B-7 | B-8 | B-9 | B-10 |
| NCO group reactive compound (B) | Pandex E-50 100 parts | Pandex E-50 100 parts | Pandex E-50 100 parts | Pandex E-50 100 parts |
| Ion-exchange water (C) | 0.6 part | 0.6 part | 0.6 part | 0.6 part |
| Catalyst (D) | TOYOCAT-ET 0.5 part | TOYOCAT-ET 0.5 part | TOYOCAT-ET 0.5 part | TOYOCAT-ET 0.5 part |
| Foam stabilizer | Toray Silicone SH-193 0.9 part | Toray Silicone SH-193 0.9 part | Toray Silicone SH-193 0.9 part | Toray Silicone SH-193 0.9 part |
| Mixing ratio of base resin (prepolymer (A))/curing agent (polyamine composition) (mass ratio) | 100/40 | 100/32 | 100/64 | 100/32 |
| Pot life of urethane resin composition (seconds) | 120 | *1 | 50 | 120 |
| Density of molded product (g/m$^3$) | 0.49 | — | 0.52 | 0.49 |
| Determination of hardness | Good | — | Good | Poor |
| Hardness of molded product (JIS A method) | 93 | — | 98 | 76 |
| Determination of moldability | Good | — | *2 | Good |
| Polishing pad (P) | P-7 | — | P-9 | P-10 |
| Determination of wear resistance | Good | — | — | Good |
| Wear loss (mg) | 130 | — | — | 110 |
| Determination of elongation | Poor | — | — | Good |
| Elongation (%) | 110 | — | — | 160 |
| Determination of permanent set | Poor | — | — | Good |
| Permanent set (%) | 75 | — | — | 45 |

*1: Impossible to mold due to high viscosity
*2: Occurrence of cracking and swelling of the lower surface of the foam

INDUSTRIAL APPLICABILITY

A two-component urethane resin composition for a polishing pad according to the present invention has excellent durability (moisture/heat resistance), brittleness control, fine cell control, and moldability (yield and molding irregularity) and particularly high strength (high elasticity) and low permanent set.

Also, a polyurethane polishing pad according to the present invention shows a small change in hardness (elastic modulus) of the polishing pad due to a temperature rise during polishing, low permanent set, and excellent brittleness control, wear resistance, and moldability (yield, molding irregularity), and is useful for uniform high-precision polishing of glass products required to have a high degree of surface flatness and in-plane uniformity, for example, a liquid crystal display (LCD) glass substrate, a hard disk (HDD) glass substrate, a recording device glass disk, an optical lens, a silicon wafer, a semiconductor substrate of a semiconductor device and the like, an optical substrate, a magnetic substrate, and the like.

The invention claimed is:

1. A two-component urethane resin composition for a polishing pad comprising a base resin containing an isocyanate group-terminated urethane prepolymer (A) and a curing agent containing an isocyanate group reactive compound (B); and
characterized in that the urethane prepolymer (A) has an isocyanate group equivalent of 250 to 700 and is produced by reacting a polyisocyanate (a1) with an aromatic polyester polyol (a2) and a polyether polyol (a3) which are used as polyol components in combination at (a2)/(a3)=5/95 to 70/30 (mass ratio), and the aromatic polyester polyol (a2) has 4 to 8 aromatic rings in its molecular chain.

2. The two-component urethane resin composition for a polishing pad according to claim 1, wherein the curing agent contains the isocyanate group reactive compound (B), water (C) serving as a foaming agent, and a catalyst (D).

3. The two-component urethane resin composition for a polishing pad according to claim 1, wherein the urethane prepolymer (A) is produced by reacting the aromatic polyester polyol (a2) and the polyether polyol (a3) as the polyol components, and a low-molecular weight glycol (a4) having a molecular weight of 50 to 300, which are used in combination.

4. The two-component urethane resin composition for a polishing pad according to claim 1, wherein the number-average molecular weight of the aromatic polyester polyol (a2) constituting the urethane prepolymer (A) is 500 to 2000.

5. The two-component urethane resin composition for a polishing pad according to claim 1, wherein the aromatic polyester polyol (a2) is phthalic acid-based polyester polyol and the polyether polyol (a3) is polytetramethylene glycol.

6. The two-component urethane resin composition for a polishing pad according to claim 1, wherein the isocyanate group reactive compound (B) is at least one selected from a polyaminochlorophertylmethane compound and a mixture of a polyaminochlorophenylmethane compound and polytetramethylene glycol.

7. The two-component urethane resin composition for a polishing pad according to claim 6, wherein the polyaminochlorophcnylmethane compound is 4,4'-diamino-3,3,'-dichiorodiphenylmethane.

8. A polyurethane polishing pad characterized by using the two-component urethane resin composition for a polishing pad according to any one of claims 1 to 6.

9. A method for producing a polyurethane polishing pad characterized by injecting the two-component urethane resin composition for a polishing pad according to any one of claims 1 to 6 into a mold, foaming and curing the composition, removing a foamed product from the mold, and slicing the foamed product into a sheet.

* * * * *